No. 609,351. Patented Aug. 16, 1898.
I. JOYNER.
MOP WRINGER.
(Application filed Mar. 30, 1897.)
(No Model.)

Witnesses.
G. M. Andrews
Phill C. Masi.

Inventor.
Isaac Joyner
by E. W. Anderson
his Attorney.

UNITED STATES PATENT OFFICE.

ISAAC JOYNER, OF ANDERSON, INDIANA.

MOP-WRINGER.

SPECIFICATION forming part of Letters Patent No. 609,351, dated August 16, 1898.

Application filed March 30, 1897. Serial No. 629,938. (No model.)

*To all whom it may concern:*

Be it known that I, ISAAC JOYNER, a citizen of the United States, and a resident of Anderson, in the county of Madison and State of Indiana, have invented certain new and useful Improvements in Mop-Wringers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
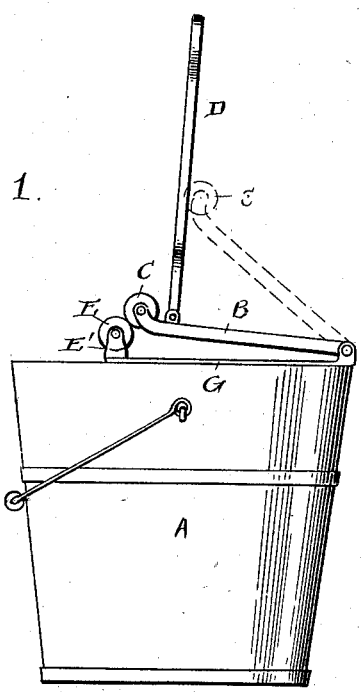
Figure 2:
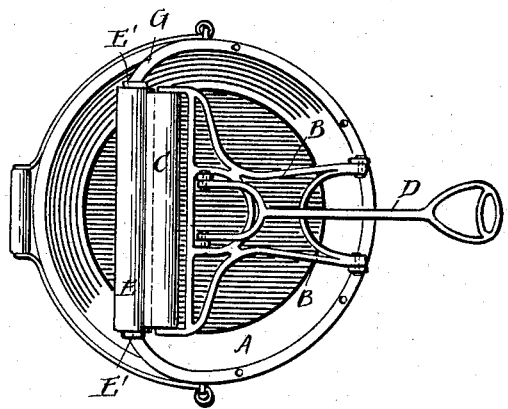

Figure 1 of the drawings is a side elevation of the invention, and Fig. 2 is a top plan view of same.

This invention is designed to provide a mop-wringer of improved character; and it consists in the novel construction and combination of parts, all as hereinafter described, and pointed out in the appended claim.

Referring to the accompanying drawings, the letter A designates a pail or bucket to which my improved wringer is shown as attached.

B designates an arm or bail which is hinged or pivoted to the upper edge of the bucket, at one side, and which is of such length that when turned down into operative position it will reach across somewhat more than half the diameter of the top of the bucket. Journaled in upwardly-projecting ends or lugs of said bail is a roller C, which is similar to the rollers employed in ordinary clothes-wringers.

D designates a handle which is connected to said bail, the connection being preferably a pivoted one, in order that the handle may when not in use be turned down upon the bail, in which position it does not interfere with the carrying of the bucket by its bail. The length of the handle is substantially equal to the height of the bucket, and it is thereby adapted to serve as a support for the roller-carrying bail when the latter is thrown back on its pivot into reversed horizontal position.

E designates a second roller which is journaled in bearings E', rigidly attached to the bucket near the opposite side thereof from the bail. When the bail B is turned down into operative position, its roller C rests partially upon the roller E, and the two rollers are in coöperative relation to each other. The bearings for the bail and for this roller E may be conveniently formed upon a metal strap G, which is securely riveted or otherwise fastened to the upper edge of the bucket. This strap extends around somewhat more than one-half the circumference of the bucket, and its end portions are turned inwardly over the bucket to provide the bearings for the roller C'. The bearings for the arm or bail B are provided by means of upwardly-projecting lugs at the intermediate portion of said strap.

The bail B is raised, as indicated in Fig. 1, to permit the mop to be inserted into the bucket. It is then closed down as the mop is withdrawn and is held down while the mop is pulled through between the two rollers by pressure on the handle D with one hand.

Having thus described my invention, what I claim as new, and desire to secure by Letters Patent, is—

The herein-described mop-wringing attachment for buckets, consisting of a flat metallic strap G, adapted to be secured to the upper edge of a bucket and to extend around somewhat more than one-half the circumference of the same, its free end portion being turned inward and up to form bearing-lugs, a roller journaled in the said lugs, a frame or bail pivoted to the intermediate portion of the said strap and carrying a second roller, and a handle pivoted to said frame or bail near the roller thereof, and adapted to lie flat upon the same when not in use, said handle being substantially equal in length to the height of the bucket whereby it is adapted to form a support for said bail or frame when the latter is thrown back into reversed position, substantially as specified.

In testimony whereof I affix my signature in presence of two witnesses.

ISAAC JOYNER.

Witnesses:
   GEO. A. SHIELDS,
   D. C. CHIPMAN.